June 26, 1928.
J. F. GREENE
1,675,215
DIRECTION INDICATOR
Filed Feb. 4, 1928
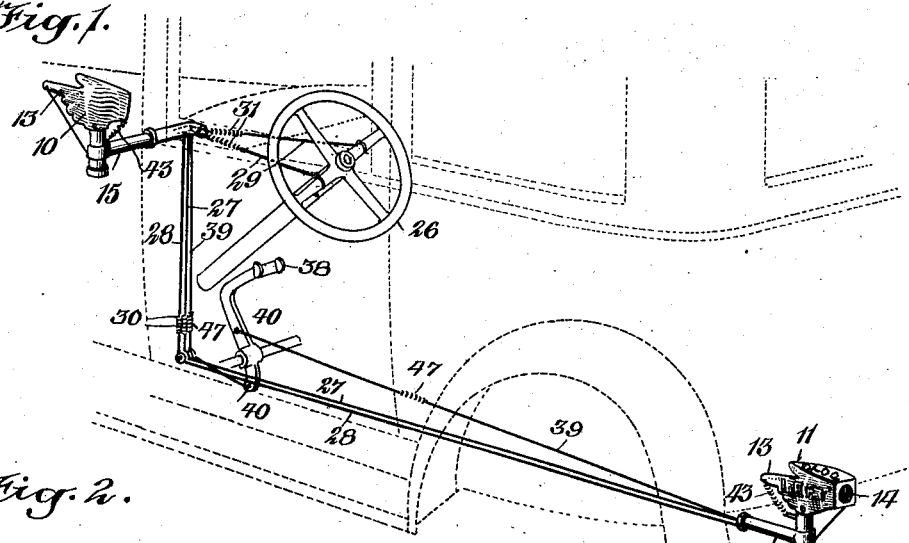
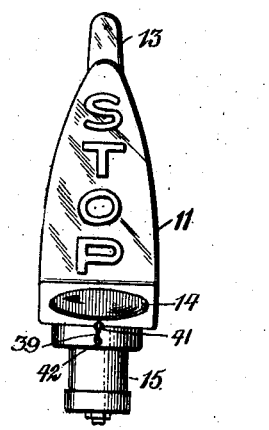
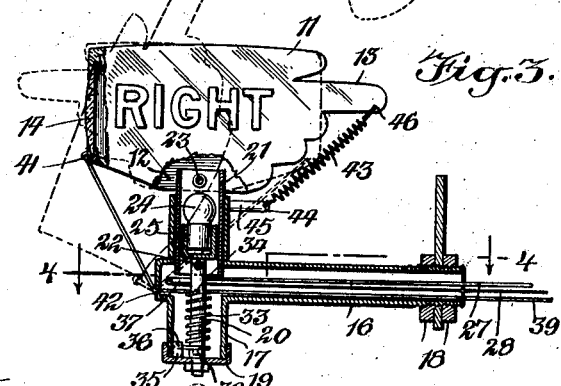
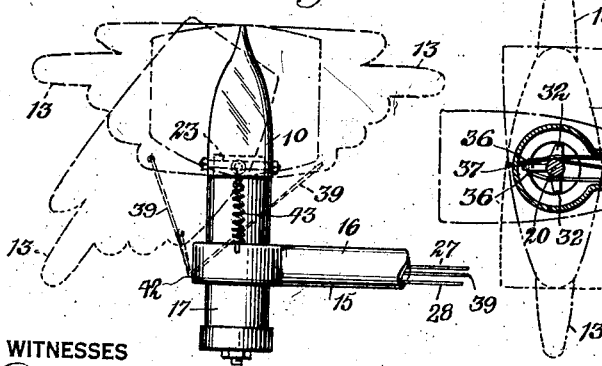
WITNESSES
INVENTOR
John F. Greene
BY
ATTORNEY Patented June 26, 1928.

1,675,215

UNITED STATES PATENT OFFICE.

JOHN F. GREENE, OF BROOKLYN, NEW YORK, ASSIGNOR OF ONE-HALF TO JOSEPH H. WEBER, OF LANDING, NEW JERSEY.

DIRECTION INDICATOR.

Application filed February 4, 1928. Serial No. 251,840.

This invention relates to an apparatus for indicating changes in direction of travel of an automobile in accordance with the present day rules of traffic.

Some of the objects of the invention are: to provide an apparatus including signal elements for the front and rear of an automobile mounted for movement to signaling and non-signaling positions for indicating to operators of other vehicles changes in direction of travel; to operate the signal elements in response to the operation of the steering gear and brake mechanism of an automobile to indicate "left" and "right" turns and that the automobile is about to stop; to operate the signal elements in a similar manner and simultaneously; and to provide novel means in a direction indicator for use in the nighttime as well as the daytime.

With the foregoing and other objects in view, the invention resides in the particular provision, relative disposition, and operation of the parts hereinafter fully described and illustrated in the accompanying drawing, in which—

Figure 1 is a view illustrating the apparatus applied to an automobile, a portion of which is shown in dotted lines.

Fig. 2 is a rear view of the device with the signal element thereof in one of its signaling positions.

Fig. 3 is a sectional view, partly in elevation, of the rear signal device, the signal element thereof being shown in its normal position in full lines and in its other signaling positions in dotted lines.

Fig. 4 is a sectional view taken substantially on the line 4—4 of Fig. 3.

Fig. 5 is an elevation of the front signal device with the signal element thereof shown in full lines in its normal position, and in its signaling positions in dotted lines.

Generally stated, the apparatus of the present invention comprises signal elements consisting of a front signal element and rear signal element; a suitable support on which each signal element is mounted for turning and pivotal movement; and means for simultaneously actuating the signal elements. The apparatus of the present invention may be used advantageously on an automobile to indicate changes in direction of travel of the automobile, as follows: to indicate "left" and "right" turns; and to indicate that the automobile is about to stop.

Referring now more particularly to the drawing it will be apparent that there is shown a front signal element 10 and a rear signal element 11. Each of the signal elements may be made of stout glass or celluloid of a translucent nature, will be of hollow construction with an opening 12, and in the form of a hand having a pointing index finger designated 13. Each of the signal elements will embody the words "right" and "left". It is also to be understood that each signal element may be made of metal in which case the words "right" and "left" will be incorporated in the form of a stencil with a translucent panel adjacent thereto. The rear signal element 11 differs from the signal element 10 in that it will also embody the word "stop" at the top thereof as shown, and a colored lens 14 by virtue of which the rear signal element will serve as a tail light. A suitable support 15 is provided for each signal element to mount the same for turning and pivotal movement. The support 15 consists of tubular members 16 and 17 arranged perpendicular to each other. The support 15 will be fixedly secured to a part of the automobile, which may be accomplished in any preferred manner, and in the present instance is accomplished by the use of clamping nuts 18 on one end of the tubular member 16. A cap 19 is threaded on the lower end of the tubular member 17. A suitable arbor or shaft 20 is positioned centrally of the cap 19 and extends upwardly in the tubular member 17. Secured in any suitable manner to the upper end of the shaft 20 is a tubular member 21. In the present instance the tubular member 21 is secured to the shaft 20 by a transverse pin 22. The tubular member 21 fits in the upper end of the tubular member 17. The tubular member 21 turns with the shaft 20. The related signal element is connected for pivotal movement to the upper end of the tubular member 21 at 23. Each of the signal elements 10 and 11 is thus mounted for turning and pivotal movement.

In order to illuminate each of the signal elements in the nighttime there is arranged in the tubular member 21 an electric lamp 24 which is received in a socket 25 secured to the upper extremity of the shaft 20. The lead wires (not shown) to the lamp and socket may be brought in through the tubular member 16.

Each signal element 10 is moved from its normal or non-signaling position to the "left" and "right" signaling positions in response to the operation of the steering wheel 26 of the steering gear of the automobile. This is accomplished by the provision of suitable flexible elements such as chains or wires 27 and 28, there being one pair of such members leading to each signal element which are connected with terminals 29 connected directly with diametrically opposite arms of the steering wheel 26. The wires 27 and 28 to the rear signal element have connected therewith springs 30, there also being springs 31 connected with the terminals 29 so as to obviate undue pulling strains on the signal elements. The wires 27 and 28 are led into the tubular member 16, and each is connected with a laterally disposed member 32 on the shaft 20 and it will now be apparent that when a pull is exerted on the wires 27 by turning the steering wheel 26, both of the signal elements 10 and 11 will be moved to a signaling position indicating a "right" turn, and when the pull is exerted on the wires 28 both signal elements will be moved to a signaling position indicating a "left" turn. Each signal element is returned to its normal position by a spring 33 which surrounds the shaft 20 and has one end thereof connected with the shaft as at 34, and its lower end connected with a lug 35 as at 36. Each signal element is limited in its turning movement to substantially 180°, and this is accomplished by the provision of members 37 disposed diametrically opposite each other on the shaft 20. Each of the members 27 is of a length to engage the lug 35.

In order to move both signal elements 10 and 11 simultaneously to a third signaling position to indicate that the automobile is about to stop in response to the operation of a service member such as the brake pedal 38 of the brake mechanism of the automobile there is provided a suitable flexible element such as a chain or wire 39, one end of which is connected with the pedal 38 as at 40 and the opposite end thereof is connected with the signal element as at 41. The wire 39 connected with the front signal element 10 extends through the tubular member 16 of the support 15, and through a hole 42 in the tubular member 17, the latter being so positioned that when a pull is exerted on the wire 39 by operating the pedal 38, the signal element 10 will be turned substantially 90° and will also be pulled downwardly on the pivot 23 to a nearly vertical position. At the same time the rear signal element 11 will be moved from its normal non-signaling position to an angular position without any turning movement being imparted thereto, so as to display the word "stop", as shown in Fig. 2. When the pulling force on each wire 39 is released by allowing the pedal 38 to return to its normal position, each signal element will be returned to the non-signaling position by a spring 43 one end of which is connected as at 44 with a lateral member 45 on the tubular member 17, and the opposite end thereof is connected as at 46 with the related signal element. Each of the wires 39 is connected in its length with a spring 47 to compensate for any excessive pulling strain on the connected signal element.

From the foregoing it will be apparent that there has been described an apparatus which will operate in response to the operation of the steering gear and brake mechanism of an automobile to indicate changes in the direction of travel of the automobile; that front and rear signal elements will be actuated simultaneously to indicate "left" and "right" turns and that the automobile is about to "stop"; and that the signal elements may be illuminated in the nighttime to give greater visibility to operators.

It is to be understood that use may be made of only one of the signal elements, the rear signal element 11 for instance, and the parts associated therewith which constitute a single device.

It is to be understood that the invention is not restricted to the precise arrangement of parts shown and described, as details of construction may be modified and rearranged without departing from the spirit of the invention, the scope of which is limited only by the terms of the appended claims.

I claim:

1. A travel direction indicating device comprising a signal embodying the words "left", "right" and "stop", means mounting the signal for rotary and pivotal movement, yieldable means having a normal tendency to move the signal to a position in which the word "stop" will be out of indicating position, means for effecting the rotatory movement of the signal to signaling positions to present the words "left" and "right" to indicate corresponding travel direction, and means for effecting the pivotal movement of the signal to present the word "stop" to indicate a stop in travel.

2. A travel direction indicating apparatus comprising a plurality of signals, means mounting the signals normally disposed horizontally for movement to signaling positions from non-signaling positions while horizontally disposed to indicate left and right turns, and also mounting said signals for movement regardless of their positions while horizontally disposed to substantially vertical positions to indicate a slow-up or stop in travel, means for effecting the simultaneous movement of the signals to similar signaling and non-signaling positions while horizontally disposed, and means for effecting the movement of each of the signals to the vertical signaling position.

3. A travel direction indicating device comprising a signal, means mounting the signal normally disposed horizontally for movement to signaling positions from a non-signaling position while horizontally disposed to indicate left and right turns, and also mounting said signal for movement regardless of its position while horizontally disposed to a substantially vertical position to indicate a slow-up or stop in travel, means for effecting the movement of the signal to signaling and non-signaling positions while horizontally disposed, and means for effecting the movement of the signal to the vertical signaling position.

4. The combination with a vehicle including steering means and brake applying means; of signals, means mounting the signals normally disposed horizontally for movement to signaling positions from non-signaling positions while horizontally disposed to indicate left and right turns, and also mounting said signals for movement regardless of their positions while horizontally disposed to substantially vertical positions to indicate a slow-up or stop in travel, means connected with the steering means and signals operated by the operation of the steering means to effect the movement of the signals simultaneously to similar signaling and non-signaling positions while horizontally disposed, and means connected with the brake applying means and signals operated by the operation of the brake applying means to effect the movement of the signals simultaneously to the vertical signaling positions.

5. A travel direction indicating apparatus comprising a plurality of signals, means mounting the signals normally disposed horizontally for movement to signaling positions from non-signaling positions while horizontally disposed to indicate left and right turns, and also mounting said signals for movement regardless of their positions while horizontally disposed to substantially vertical positions to indicate a slow-up or stop in travel, means for effecting the simultaneous movement of the signals to similar signaling and non-signaling positions while horizontally disposed, and means for effecting the movement of the signals simultaneously to the vertical signaling positions.

Signed at New York, in the county of New York and State of New York, this 3rd day of Feb., A. D. 1928.

JOHN F. GREENE.